May 29, 1928.  L. W. WILLIAMS  1,671,958
FILTER
Filed Nov. 24, 1926
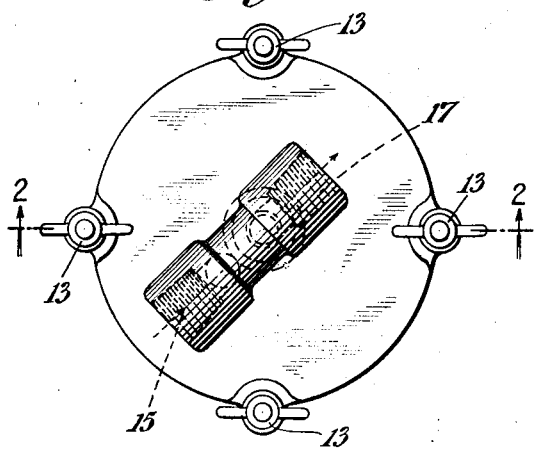
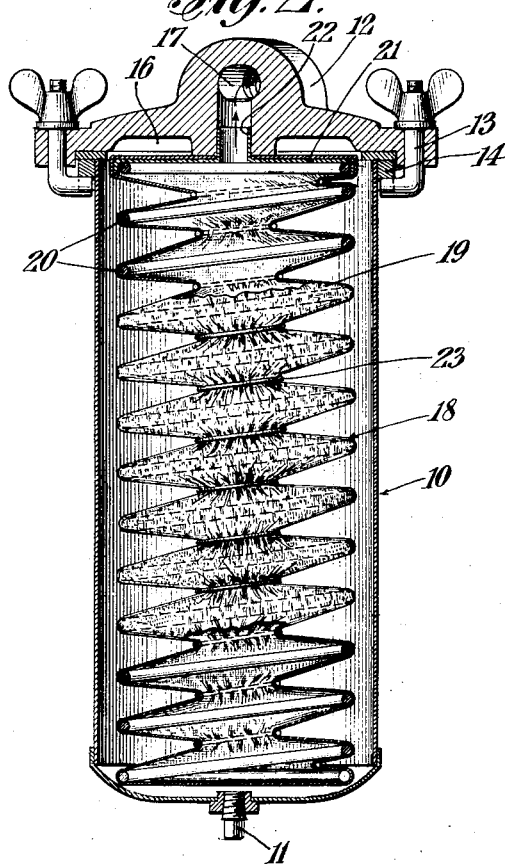
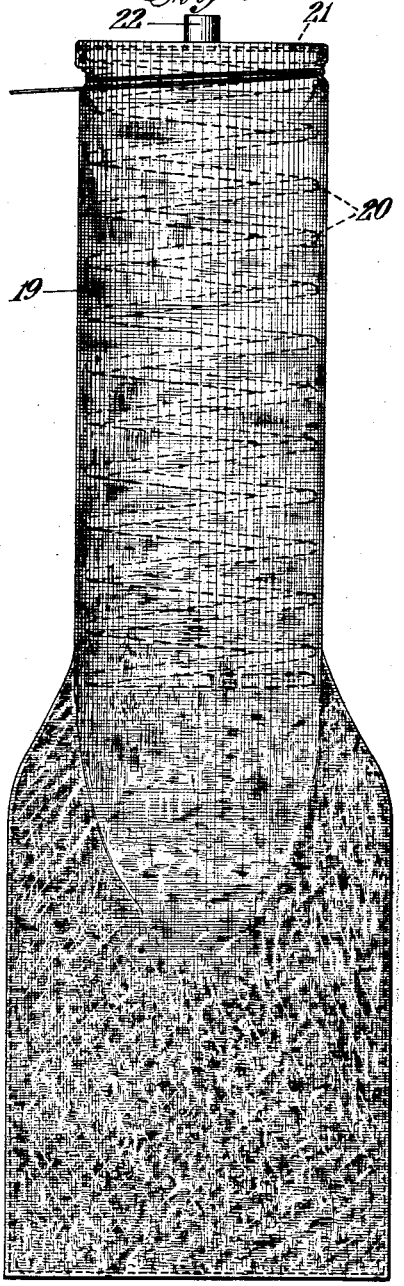
Inventor
Lewis W. Williams
By his Attorneys
Kenyon & Kenyon Patented May 29, 1928.

1,671,958

UNITED STATES PATENT OFFICE.

LEWIS W. WILLIAMS, OF EAST ORANGE, NEW JERSEY, ASSIGNOR, BY MESNE ASSIGN-
MENTS, TO CENTRAL UNION TRUST COMPANY OF NEW YORK, TRUSTEE.

FILTER.

Application filed November 24, 1926. Serial No. 150,434.

This invention relates to filters and has for an object a simple, inexpensive and small filter capable of quickly and efficiently removing deleterious solid material from a large volume of oil or the like.

According to this invention the filtering unit is of flexible construction and comprises an envelope of filtering fabric, such for example, as cotton flannel, within which envelope is arranged a wire helix of substantially the same cross-sectional area as the envelope. A second helix of smaller diameter is arranged exteriorly of the envelope with its turns intermediate the turns of the interior helix, thereby producing a filtering unit of screw-like appearance. The resiliency of the larger helix makes the unit self-spacing, maintains uniform the relation of the turns at all times, and counteracts any tendency of the adjacent filtering surfaces to move toward each other when subjected to pressure or the weight of filtered material deposited thereon. This filtering unit is arranged within a casing provided with an inlet communicating with the body of the casing and an outlet communicating with the interior of the filtering unit through a conduit provided for the purpose. Fluid to be filtered passes from the body of the casing to the interior of the filtering unit through the filtering medium which removes the contaminating particles. By virtue of the screw-like form of the filtering unit a large filtering area is provided within a comparatively small space. Moreover, there is no resistance to the flow of filtered oil from the interior of the filtering unit so that a relatively large volume of oil may be passed through the filter in a comparatively short time. The material of which the filtering envelope is composed may be selected according to the character of the impurities which are to be filtered out and the resistance of the filtering medium to the flow of fluid therethrough is the determining factor of the capacity of the filter. The flexible construction of the filtering unit makes it easy to clean, as cleaning liquid may be sucked into the unit by compressing it and then allowing it to expand while its conduit extends into a body of the cleaning liquid. Then by plugging the conduit and compressing the unit the cleaning liquid is forced outwardly through the filtering envelope thereby washing off the filtered dirt that has accumulated on the outside thereof.

Other objects, novel features and advantages of the invention will be apparent from the following specification and accompanying drawings, wherein Fig. 1 is a plan view of the filter embodying the invention.

Fig. 2 is a section on the line 2—2 of Fig. 1, and

Fig. 3 is a view of the filtering unit during assembly.

10 designates a cup-shaped casing which may be composed either of stamped metal or may be a casting and in the bottom of which is provided a drain opening closed by the plug 11. A cover 12 for the casing is provided with clamps 13 cooperating with a ring 14 on the casing 10 for attaching the cover to the end of the casing in closing position. A fluid-tight fit is ensured by means of a suitable gasket or the like. In the cover 12 is provided an inlet conduit 15 terminating in an annular recess 16 and an outlet conduit 17 having its inner end co-axial with the casing 10.

Within the casing 10 is provided a flexible filtering unit which comprises an envelope 19 of filtering fabric, such for example, as cotton flannel or the like, the interior of which is in communication with the outlet port 17. The envelope 19 surrounds a slow-pitch wire helix 20 of substantially the same diameter as the envelope and of slightly less diameter than the casing. At one end of the helix is provided a metal cap 21 having a central tube 22 extending through an aperture in the end of the envelope and into the outlet port 17. A second wire helix 23 of less diameter than the helix 20 surrounds the envelope 19 and has its turns arranged intermediate the turns of the helix 20. The envelope is thus drawn in between the turns of the helix 20 to form a screw-like unit, the threads of which comprise the filtering area of the unit.

The envelope 19 may be formed by doubling a piece of filtering fabric and stitching together the edges, an aperture being formed centrally of the fold. The finished envelope should be materially longer than the casing and may be several times its length so that when formed into screw shape by the inner and outer helices it will present a filtering area notably larger than the area of the casing walls and yet be of compact size. The helix 20 with the cap 21 attached is then placed within the envelope 19 with the tube 22 projecting through the aperture in the fold and the open end of the envelope projecting beyond the end of the helix 20 after which the ends of the fabric are stitched together to completely close the envelope. A wire may be then affixed to one corner of the envelope near the cap 21, passed around the surface of the envelope and through the other corner at the same end, and is returned toward the first corner to draw together the corners and fold the envelope smooth around the edge of the cap 21 after which the wire is helically wound between the turns of the helix 20 thereby taking up the extra length of the envelope 19. The wire draws the envelope in toward the axis of the helix 20 a distance greater than that between the turns of the helix to produce what amounts to a conduit extending through the envelope of slightly greater cross-section than that of the tube 22. The slow pitch of the helix 20 and the drawing in of the envelope provides a much larger effective filtering area than the area defined by the overall dimensions of the helix. The other two corners of the envelope are drawn together by the wire of the helix 23 in the same manner as above described. During the winding of the helix 23 the filtering unit may be supported by means of a mandrel passed through the tube 22 if desired. The filtering unit is now somewhat longer than the depth of the casing 10 so that when it is arranged therein the helices are somewhat compressed, thereby ensuring a tight fit between the head 12 and the cap 21, a portion of the envelope acting as a gasket.

The screw-like contour of the filtering unit provides a large contact area in a small space and the unobstructed condition of the interior of the filtering envelope reduces the resistance to the flow of filtered oil to a minimum. The rate of flow through this type of filter is limited only by the resistance of the filtering medium itself. It is therefore, possible for such filter to filter a large volume of oil in a comparatively short space of time, making use of relatively low pressure, especially if the character of the filtering operation be such that a comparatively coarse fabric may be used.

The helix 20 is preferably made of spring wire so that the filtering unit is self-spacing and its resiliency counter-acts any tendency of the various turns, especially the lower ones, to move toward each other under the pressure of the oil and weight of material deposited on their surfaces, which tendency, if not overcome, would materially reduce the effective filtering area. The second helix 23 may also be resilient or it may be of soft wire or other suitable material for ease of manufacture. The resiliency of the helix 20 not only maintains uniform spacing between the turns of the filter element but it serves to support the element in the casing and maintain a liquid-tight seal between the head 12 and the cap 21. It likewise makes the element readily removable when the casing is demounted from the head and it assists in the operation of cleaning the element by expanding it and stretching the filter cloth between successive applications of pressure so that dirt and muck deposited on the element are quickly and easily removed.

Moreover, the filtering unit may be easily and quickly replaced and because of its flexible construction may be easily cleaned. To clean the filtering unit it need only be removed from the casing and compressed with the tube 22 plugged. The oil within the filter will thereupon be forced outwardly, thereby washing off the accumulation on the exterior. If it is desired not to use the filtered oil for this purpose or if such action is insufficient completely to clean the envelope it may be filled with any suitable cleaning fluid while expanded and then compressed as above described thereby forcing off the accumulated dirt from the exterior of the envelope. The cleaning operation may advantageously be accomplished by compressing and expanding the unit several successive times while the conduit 22 is submerged in the cleaning liquid and plugging the conduit during the compressing of the unit thereby forcing the cleaning liquid in a reverse direction through the fabric.

The filter above described is of particular utility in removing deleterious solid materials from oil to be used as fuel in heating systems or from oil used in connection with machine tools and automatic machinery where force feed lubrication is used. It is also useful in the purifying of the lubricant of internal combustion engines and the like, as well as in connection with Diesel and semi-Diesel engines. Also, it may be used in many other ways, such for example, as in grinding machinery to filter the fluid used to cool the work being polished or ground.

What I claim as new and desire to secure by Letters Patent of the United States is:

1. In a filter, a filtering unit comprising a flat envelope of filtering material, a helix arranged within said envelope, a helix surrounding said envelope, each end of said second helix being passed through both corners of one end of the envelope, doubled back and attached to one of said corners whereby the two corners are drawn together to pull the envelope tight across the end of the inner helix.

2. In a filter, a casing, a head having inlet and outlet ports, a filtering unit within said casing, said unit comprising an envelope of filtering material, a resilient frame within said envelope, and a tube leading from said filtering unit and extending into said outlet port, said frame being under compression to retain said tube in said outlet port.

3. In a filter, a casing, a head therefor having inlet and outlet ports, a filtering unit comprising an envelope of filtering material, a resilient helix within said envelope, and a tube leading from the interior of said unit and extending into one of said ports, said helix being under compression whereby said tube is maintained in said port.

4. In a filter, a casing, a head having inlet and outlet ports, a filtering unit in said casing, said unit comprising an envelope of filtering material, a resilient helix within said envelope, a second helix surrounding said envelope, said second helix being of smaller diameter than said first helix and having its turns arranged between the turns of said first helix, and a tube leading from said unit and extending into one of said ports, said first helix being under compression whereby said tube is maintained in said port.

5. In a filter, a casing, a head having inlet and outlet ports, a filtering unit in said casing, said unit comprising an envelope of filtering material, a resilient helix within said envelope, a metal cap at one end of said helix, a tube supported by said cap and projecting through an aperture in said envelope into one of said ports, said helix being under compression whereby said tube is maintained in said port and a portion of said envelope is compressed to form a gasket between said head and said cap.

6. In a filter, a casing, a filtering unit in said casing, said unit comprising a resilient helix, an envelope of filtering material surrounding said helix and a second helix arranged exterior of said envelope, said second helix being of smaller diameter than said first helix and having its turns arranged between the turns of said first helix, said first helix being mounted in said casing under compression and being of sufficient resiliency to withstand without further contraction the pressure to which the filtering unit is subjected under normal operating conditions, an inlet communicating with the space between said unit and casing wall and an outlet communicating with the interior of said unit.

In testimony whereof, I have signed my name to this specification.

LEWIS W. WILLIAMS.